United States Patent [19]

Peynaud et al.

[11] Patent Number: 6,069,842
[45] Date of Patent: May 30, 2000

[54] METHOD AND DEVICE FOR HELICOPTER-BORNE MINE COUNTERMEASURES

[75] Inventors: François Peynaud, Brest; Jean Verveur, La Crau; Henri Lagain, Plouzane; Pascal Abomnes, Brest, all of France

[73] Assignee: Thomson Marconi Sonar S.A.S., Sophia Antipolis, France

[21] Appl. No.: 09/147,540

[22] PCT Filed: Jul. 18, 1997

[86] PCT No.: PCT/FR97/01342

§ 371 Date: Jan. 19, 1999

§ 102(e) Date: Jan. 19, 1999

[87] PCT Pub. No.: WO98/03883

PCT Pub. Date: Jan. 29, 1998

[30] Foreign Application Priority Data

Jul. 19, 1996 [FR] France ................................... 96 09083

[51] Int. Cl.[7] ................................................... G01S 15/00
[52] U.S. Cl. ............................................................. 367/106
[58] Field of Search ..................................... 367/165, 173, 367/4, 106; 89/1.13

[56] References Cited

U.S. PATENT DOCUMENTS 5,155,706  10/1992  Haley et al. .............................. 367/88
5,602,801  2/1997  Nussbaum et al. ..................... 367/165

FOREIGN PATENT DOCUMENTS 2093996  9/1982  United Kingdom .

*Primary Examiner*—Daniel T. Pihulic
*Attorney, Agent, or Firm*—Oblon, Spivak, McClelland, Maier & Neustadt, P.C.

[57] ABSTRACT

The invention relates to underwater mines countermeasures methods and devices that can be employed from a helicopter.

It consists in using the body (101) of a known passive heli-winched sonar, fitting to it emitting antennas (105, 106) arranged in this body parallel to its axis and a receiving antenna perpendicular to this axis and formed of two articulated arms (107, 108) that can be retracted inside the body. Two other arms (114, 113) that can be retracted into the body have propulsion means (111, 112) at their free ends, to allow the body to be stabilized about its axis.

The invention makes it possible to employ lightweight helicopters for underwater mines countermeasures, allowing the mines to be relocated and, if appropriate, destroyed without having to backtrack.

10 Claims, 4 Drawing Sheets

METHOD AND DEVICE FOR HELICOPTER-BORNE MINE COUNTERMEASURES

BACKGROUND OF THE INVENTION

Field of the Invention

The present invention relates to helicopter-borne underwater mines countermeasures methods and devices in which the means employed for mine-hunting are suspended beneath a helicopter which allows these means at the end of a power and winching cable to be dunked. This makes it possible, on the one hand, to limit the risks of destroying the mines by explosion merely to the destruction of these means, in protecting the carrier, and on the other hand, to increase the speed with which such a system can be deployed.

SUMMARY OF THE INVENTION

Systems comprising magnetically or acoustically influenced drogues and side-scanning sonars towed by large heavy helicopters, of the MH53 type for example, completely dedicated to this mission, are known. These systems are, however, bulky, heavy and expensive and require the use of a very large helicopter that cannot be carried on a medium-tonnage naval carrier such as a frigate for example. The use of its systems is therefore very limited.

Furthermore, the sonars fitted to these systems are of the side-scanning type and are therefore not suited to the detection of moored mines. What is more, the very principle of side-scanning sonar presupposes that it should operate by continuous advancement of its antennas and therefore of their carrier. This being the case, when a suspect object is located, it is difficult to backtrack and re-locate it and to determine precisely the nature of this object (to classify it).

These difficulties prevent the system from being supplemented by a device for destroying the mines which can be carried on board the spotter helicopter. Now, this need to destroy the mine immediately after spotting it is essential when the helicopters are patrolling in front of a flotilla in order to protect it.

There is also known from another source, especially from a French patent filed by THOMSON-CSF on Nov. 28, 1988 under the Ser. No. 86/13485 and published on Apr. 1, 1988 under the U.S. Pat. No. 2,604,530, an anti-submarine warfare device in which use is made of a sonar in the form of a low weight elongate dome of small bulk suspended at the end of the power and winching cable from a winch, itself installed in a low-tonnage helicopter.

This sonar comprises a set of arms which unfold like an umbrella and which support acoustic sensors at their ends, this making it possible to obtain a very large-sized antenna when the arms are deployed. For raising and lowering the dome, the arms are folded. This sonar allows sources of noise, for example submarines submerged at the bottom of the sea, to be located.

In order to alleviate the abovementioned drawbacks, the invention proposes a helicopter-borne underwater mines countermeasures method, in which use is made of sonar means suspended beneath a helicopter, mainly characterized in that use is made of a lightweight sonar dome equipped with means of detecting and classifying the mines and in that the helicopter is made to pass through a series of successive fixed points during which the sonar dome at the end of a power and winching cable paid out by a winch borne by the helicopter is dunked into the water in order to detect and/or classify the mines in a series of successive sectors forming a route that is to be cleared of mines.

In order to implement this method, the invention also proposes a device, mainly characterized in that it comprises an elongate cylindrical body comprising, at its lower part, two arms deployable into a position perpendicular to the axis of the body to form a sonar receiving antenna and articulated to this body by means allowing these arms to be folded back into two first channels formed in the side face of the body parallel to the axis of this body, and at least one sonar emitting antenna located in a third channel formed in the side face of the body parallel to the axis of this body in a position allowing the emission of a sonar beam of axis perpendicular to the axis of the receiving antenna.

According to another feature, this device further comprises two other arms deployable into a position perpendicular to the axis of the body and articulated to this body by means allowing these arms to be folded back into two third channels formed in the face of the body parallel to the axis of this body, and propulsion means located at the end of the two other arms to allow the body to be orientated, when these two other arms are deployed, by making the body rotate about its axis.

According to another feature, it comprises two emitting antennas parallel to each other and located in two separate channels.

According to another feature, it comprises, at its opposite end to the articulation of the arms of the receiving antenna, a hydrodynamic stabilizing ring.

According to another feature, it comprises, at its opposite end to the articulation of the two arms of the receiving antenna, a quick connection/disconnection attachment intended for coupling it to a power and winching cable.

According to another feature, the body is formed from the body of a known passive heli-winched sonar adapted in accordance with the method according to the invention.

BRIEF DESCRIPTION OF THE DRAWINGS

Other specific features and advantages of the invention will emerge clearly from the following description given with reference to the appended drawings, which depict.

DESCRIPTION OF THE PREFERRED EMBODIMENTS

At the present point in time, all combat flotillas carry helicopters, a certain number of which are of a relatively small size and have a winch of essentially standard specifications, which allows a payload, itself relatively standardized, to be dunked.

The so-called "dunking sonar" described in the abovementioned patent is itself a practically standard piece of apparatus which is very widespread. In operation, the dome of this sonar is fixed to the end of the power and winching cable of a winch, which allows it to be lowered and raised again quickly. This dome is connected to the power and winching cable by a quick connection and disconnection attachment. This power and winching cable and this attachment therefore allow the sonar to be supplied with electrical power from the helicopter and the measurement signals to be conveyed from the dome to the helicopter. Control signals may also be sent from the helicopter to the dome.

The invention therefore proposes to fit out such a solar dome by replacing the umbrella-type deployable antennas with a set of fixed emitting antennas and deployable receiving antennas and to add propulsion motors which are themselves deployable, both allowing the dome to be stabilized in terms of azimuth and allowing this azimuth to be varied in order to cover a broad enough detection sector.

Figure 1:
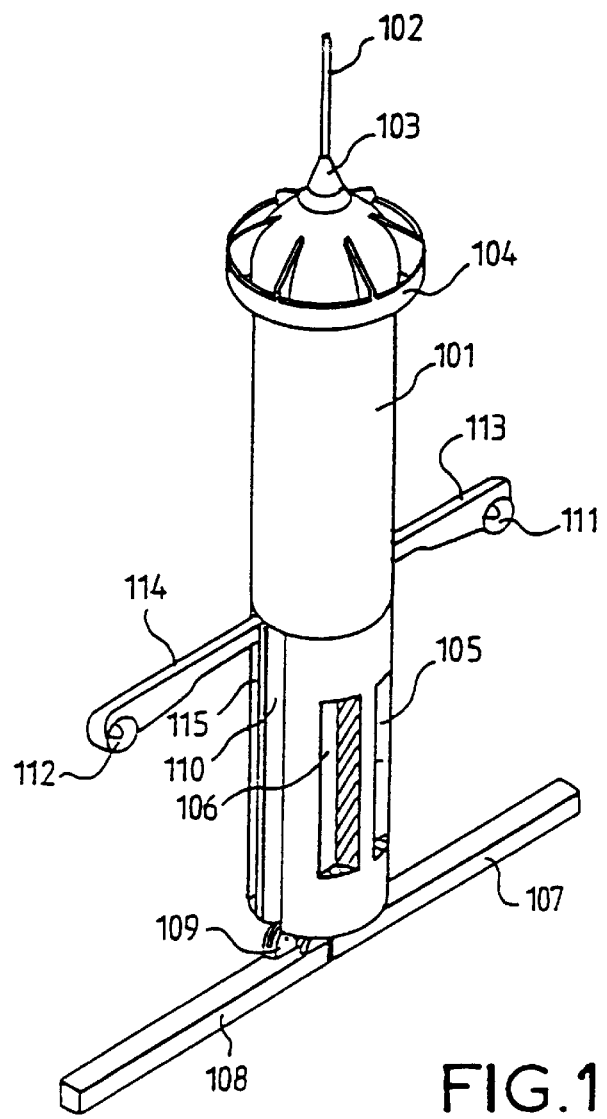
FIG. 1 a view in isometric perspective of a sonar dome according to the invention.

Such a dome is depicted in isometric perspective in FIG. 1, where it is possible to see the body of the dome 101 connected to the power and winching cable 102 by a quick-fit attachment 103 and having, at its upper part, a hydrodynamic stabilizing ring 104. These elements are entirely similar to those of the "dunking sonar" developed by the Applicant and described, in particular, in the above-mentioned patent.

Figure 2:
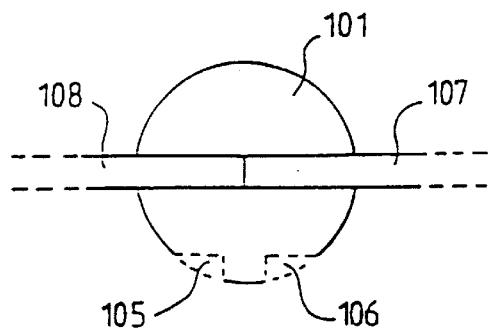
FIG. 2 a part view from below of this sonar dome.

By contrast, as far as the acoustic members are concerned, these comprise, first of all, according to the preferred embodiment, two vertical emitting antennas 105 and 106 placed in narrow openings in the form of channels running longitudinally along the body 101 on its surface. The emitting faces of these antennas lie in one and the same plane which is parallel to the receiving faces of the two antennas 107/108, as depicted in FIG. 2 in a view of this body from below.

In an alternative form, there is just one emitting antenna which lies in a channel similar to those which contain the antennas 105 and 106, but situated in the middle of the location of the latter two.

The acoustic signals emitted by these emitting antennas are reflected by the objects, for example the mines, that lie in their path. The corresponding echoes return to the dome 101 according to the well-known technique of sonar.

These reflected signals are received by a receiving antenna formed of a set of connected hydrophones in the two longitudinal, arm-shaped elements 107 and 108 which form half-antennas. In the receiving position, these half-antennas are placed end to end beneath the end of the body 101, so that they are perpendicular to the axis of this body and in a plane parallel to the plane containing the emitting antenna 105 and 106.

According to the invention, these half-antennas are articulated to the body 101 by articulation means in the form of hinges 109 which allow them to pivot with respect to the base of this body and be retracted into channels 110 formed on the surface of the body 101 longitudinally with respect to the axis thereof. In the folded position which is not depicted in the figures, the half-antennas 107 and 108 nest perfectly in the body 101, which at the same time makes it possible to eliminate hydrodynamic forces on this antenna when the complete sonar is being lowered or raised very quickly under the action of the power and winching cable 102 operated by the winch contained in the helicopter. Furthermore, this folded position allows the sonar dome to be housed in a cylindrical receptacle known as a "funnel" located on board the helicopter and which allows this dome to be stowed while the helicopter is manoeuvring. In the unfolded position, the two ends practically come into contact, as if there were just one antenna.

As it is quite obvious that such a sonar dome rotates quite freely about its axis, because it is suspended from the power and winching cable 102, it is generally necessary to stabilize it in terms of azimuth when it is in position in the water.

Furthermore, containing the acoustic characteristics of the sonars used for detecting and classifying the mines, the angular sector covered by such an emitting/receiving assembly is relatively narrow. In order to be able to satisfy operational requirements, it is necessary to carry out surveillance of the bottom of the sea and within the water over a far broader sector by orientating all of the antennas about the vertical axis of the body, preferably mechanically.

For that, the dome comprises two small propulsion motors 111 and 112, for example in the form of ducted fan screws, located at the ends of the two retractable arms 113 and 114.

These propulsion motors can run in either direction, so that through a differential action they can apply a torque that will allow the body 101 to be rotated about its longitudinal axis. Associated with means of measuring the azimuth of this body about its longitudinal axis, these means being incorporated into the body and of a known type, the body, and therefore the emitted and received beams of the antennas can thus be stabilized in terms of azimuth, and at the same time this body can be orientated in any way in order, for example, to obtain scanning of the entire zone in which detection is to be performed.

The arms 113 and 114 allow sufficient torque to be obtained with propulsion motors which do not have a high power consumption, for example, consume a few watts, but said arms are of a size comparable with that of the half-antennas 107 and 108.

Thus, in order to be able to dunk and raise the sonar under the same conditions as those seen earlier, these arms 113 and 114 are fixed to the body 101 in an articulated way so that they can be retracted into channels 115, themselves also formed in the body 101 parallel to the channels 110 into which the half-antennas 107 and 108 can be retracted.

A servomechanism of a known type, operating from information from the azimuth detector of the compass type contained in the body 101 allows this azimuth to be held fixed at a datum value received from the helicopter via the cable 102, or varied uniformly and in a known way by advancing about this datum value, possibly on the basis of orders received from the helicopter, again via the cable 102.

As can be seen in FIG. 1, the dimensions of the half-antennas 107 and 108 and of the arms 113 and 114, set, in the case of the former, in the known way by the frequencies used in the functions of detecting and classifying the mines, and in the case of the latter by a compromise between the power and the power consumption of the propulsion motors, are such that these arms lie, as do the retraction channels 110 and 115, essentially in the lower half of the dome 101.

The upper half of this dome can therefore house the electronic circuits which perform the various functions needed by the sonar, particularly the electrical power supplies, the emitting circuits with inclination compensation by phase weighting, according to a known method, the receiving and digitizing circuits of the antennas, according to a known method, and the interface circuits for controlling all the sensors, particularly the temperature, immersion, altitude and vertical and azimuth reference sensors.

It also contains the command and control circuits for the azimuth control and the circuits for interfacing with the cable 102 for receiving the command signals and the power supply signals, and transmitting to the helicopter the data received from the various sensors.

This digital information from the various sensors, particularly the information from the sonar antennas, is multiplexed and processed on board the helicopter, then presented to the operator running the system in the known way.

The half-antennas 107 and 108 and the arms 113 and 114 are deployed and retracted using electric rams commanded by the circuits located inside the electronic container on the basis of the various orders emitted by the command post in the helicopter, either directly or via a simple logic package operating on signals for raising, lowering, stopping and starting the sonar.

These rams are designed, in the known way, in such a way that in the event of a system breakdown they systematically refold the various arms, possibly via automatic disengagement of these rams and the action of return springs.

Furthermore, in the event of a complete breakdown which might even cause the arms to jam in the open position, these arms are designed, in the known way, to break and tear off without damaging the body of the sonar and the members contained therein.

Figure 3:
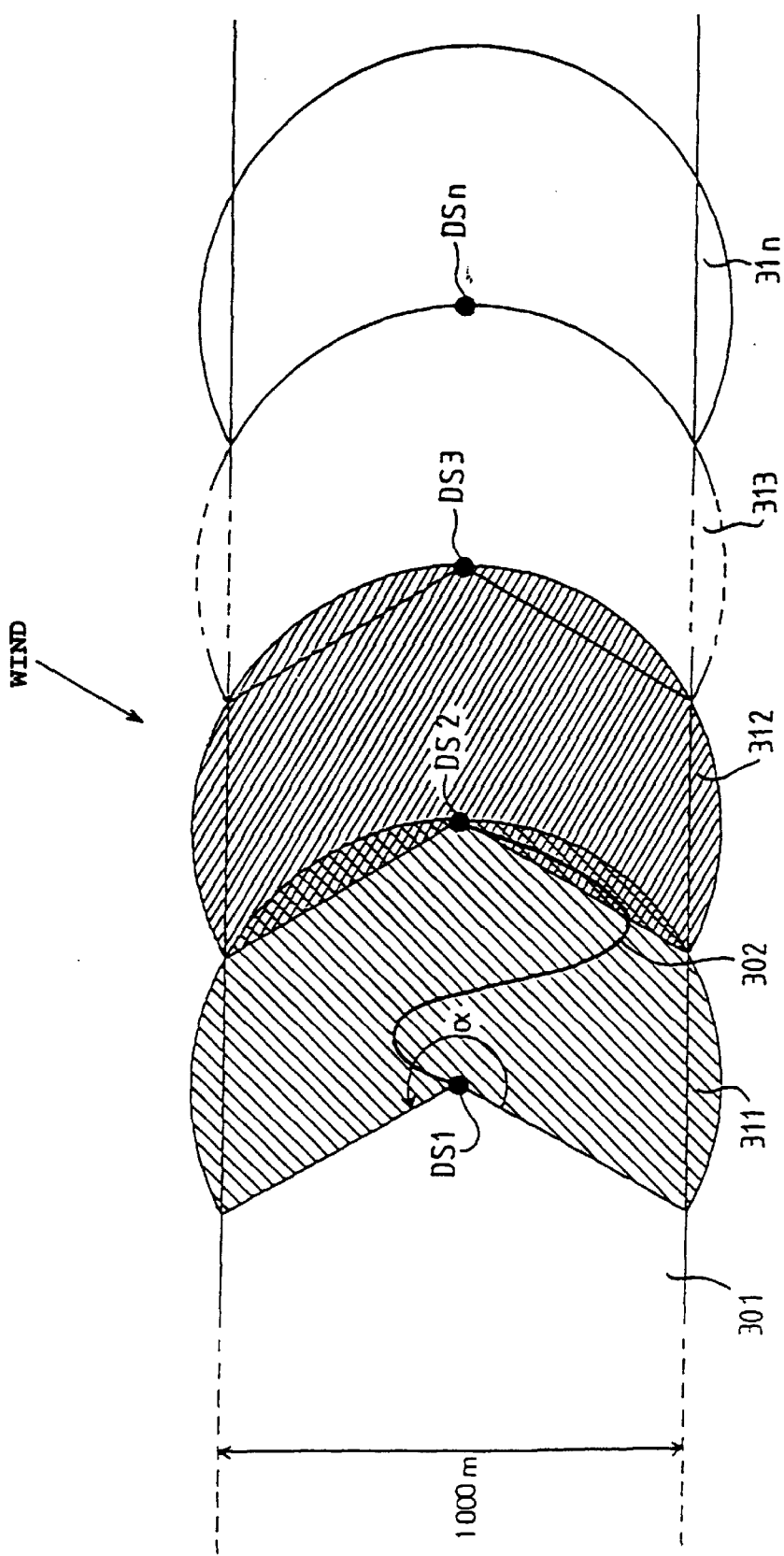
FIG. 3 a diagram of the mine-clearing of a shipping route.

Unlike current systems which are mounted on large helicopters and towed to scan the terrain, the system according to the invention can be used in an entirely different way, by performing a succession of dunks at fixed points with the helicopter hovering, as depicted in FIG. 3.

In this figure, the helicopter is clearing mines from a route 301, for example one thousand meters wide, by going to a series of fixed points DS1 to DSn.

At each fixed point, it dunks its sonar and explores a zone in the form of a circular sector of angle a. In this zone, a first scan allows suspect objects to be detected. These are then classified by switching the exploration frequencies and fixing the scanning on them. If need be, the helicopter will move to the object identified as being a mine and will drop a destruction device.

The distance between the successive fixed points DS1 to DSn is chosen to be such that the zones 311 to 31n cover the entire route that is to be cleared of mines, overlapping slightly.

In this instance, for a route one thousand meters wide, a distance of 600 meters between fixed points will suffice.

This being the case, and taking into consideration an unfavourable crosswind as depicted in the figure, which forces the helicopter to follow a route 302 with very pronounced yaw, it is possible to make the helicopter progress, using the hardware, winches and helicopters in particular commonly used for dunking sonar systems, at an average speed of 8 knots along the route. This corresponds to a time of 2 min 30 s between two successive fixed points.

This time is enough to cover the distance between one fixed point and the next, to lower the sonar, to carry out detection and classification, to raise the sonar again and to go on to the next fixed point.

Such a speed of 8 knots is entirely satisfactory in many cases. If there is a need to progress more quickly, it is possible to use several helicopters working the same route simultaneously.

To obtain maximum performance for a minimum size and weight, use will be made of a system which operates in three modes, each corresponding to a distinct central frequency.

These frequencies are commonly called A, B and C in decreasing values of frequency and correspond, for example, to 350, 250 and 150 kHz.

The first mode, using frequency C, or frequency B if the structure of the seabed makes detection difficult, is a mode for detecting moored mines or seabed mines.

The second mode, using frequency B, is a mode for classifying moored mines.

The third mode, using frequency A, is a mode for classifying seabed mines.

The horizontal antenna has a deployed length of about 1 meter and allows all three frequencies A, B and C to be received, using known multi-band technology. It is broken down in the known way into N receiving sensors forming M channels covering an angular sector on the terrain. The width of these channels and the width of the sector depend on the frequencies used.

As the height of the antenna is small, the aperture of the receiving lobe in terms of elevation is very broad and it is therefore not necessary to stabilize this lobe.

The multi-band technology that allows such a receiving antenna to be achieved is known, in particular, from a French patent filed by THOMSON-CSF on Jul. 8, 1994 under the Ser. No. 94/08474 and published on Jan. 12, 1996 under the U.S. Pat. No. 2,722,358.

Figure 4:
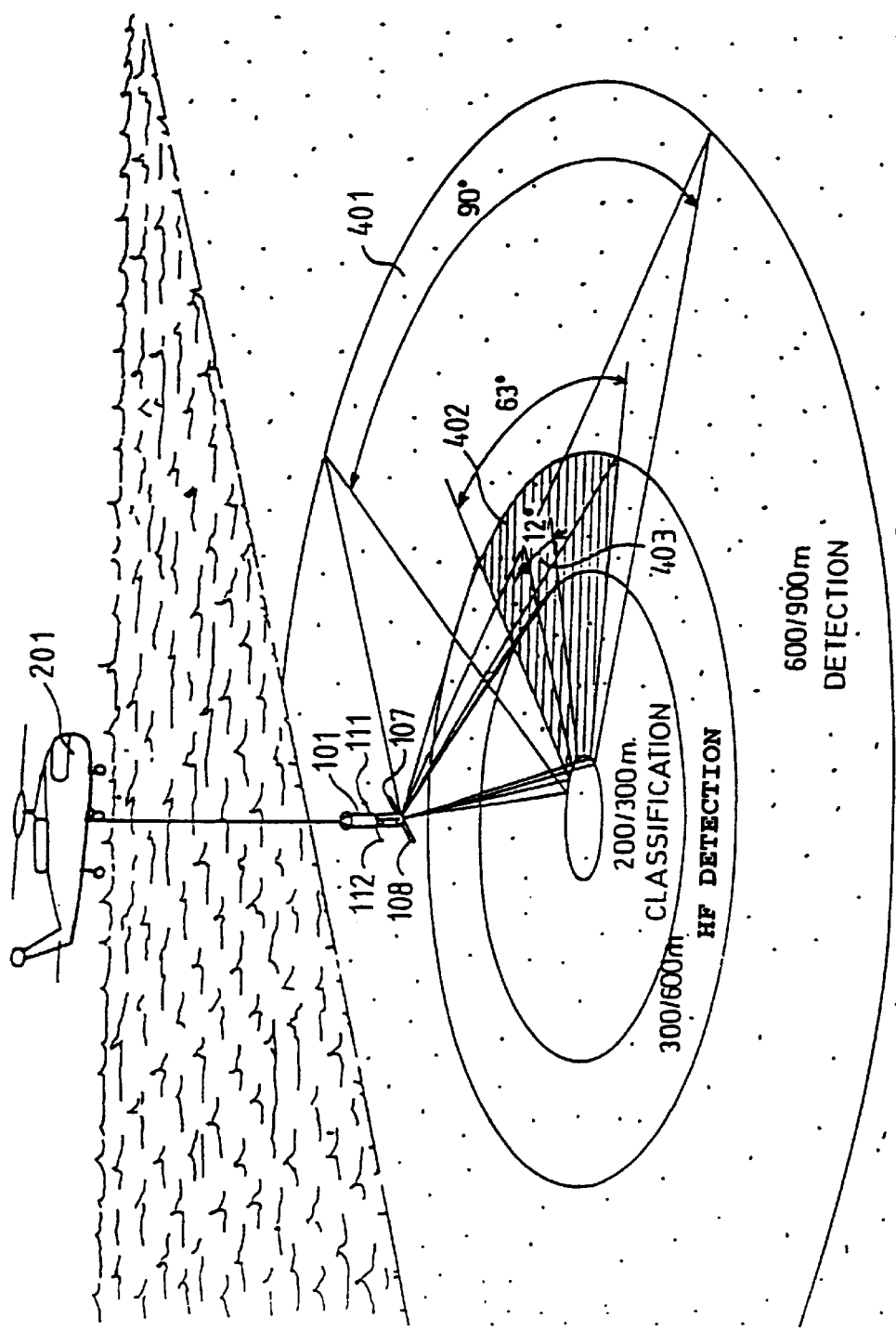
FIGS. 4 and 5 operating diagrams for two distinct modes of a sonar according to the invention.

FIG. 4 depicts one embodiment of the zones thus scanned on the seabed by the receiving beams.

In this figure, the sonar dome 101 is suspended from the helicopter 201 by the cable 102.

Depending on the frequencies used, the receiving antenna 107/108 performs surveillance of the seabed over a detection sector 401 which may be as much as 600/900 meters with an aperture of 90° and corresponding to the use of the low detection frequency C.

Using the high detection frequency D, a sector 402 is then covered which may be as much as 300/600 meters and which has an aperture of 63°.

For classification, using the high classification frequency A, a sector 403 is obtained which is only as much as 200/300 meters with an aperture of 120.

The detection sectors are formed of juxtaposed detection channels 1° wide and therefore give a horizontal resolution of 1°. There are thus 90 channels in the sector 401 and 63 channels in the sector 402.

For classification on the other hand, where the resolution needs to be far greater, channels 0.2° wide are used. The sector 403 therefore contains 60 classification channels.

As the sector 401, which is the widest, obviously does not cover the area required, as depicted in FIG. 3, the propulsion motors 111 and 112 allow the antenna 107/108 to be orientated mechanically so as to displace the sectors 401 to 403 to obtain the desired cover on the ground.

As far as the emitting antenna is concerned, to ensure that only the useful zone is irradiated with sound, the various transducers of the vertical emitting antennas are fed, according to a known technique, with signals which have phases that allow a relatively elevation-directional lobe to be obtained, this lobe being aimed essentially towards the centre of the sector that is to be irradiated with sound.

This being the case, the upper end of the lobe essentially corresponds to the furthest limit of the sector that is to be irradiated. The reduction in level of the signal emitted corresponding to the nearing of the lower end of this lobe is compensated for on the seabed by the lower absorption which corresponds to the distance which itself is shorter at this point, between the emitting antenna and the seabed.

As the emitting antenna has directional features, such stabilization in terms of elevation is therefore needed.

For that, use is made of the verticality information delivered by a sensor located in the sonar dome, and the phases of the emission signals of the various transducers of this emitting antenna are corrected in such a way as to keep an essentially constant orientation in terms of elevation, according to a known technique.

As far as the aperture of the emission lobe in terms of bearing is concerned, the situation is the opposite of the situation of the receiving antenna, because the emitting antenna is narrower, and naturally an emission lobe that is broad enough to cover the entire zone irradiated with sound and corresponding to the receiving antenna surveillance zone is therefore obtained.

The emission X reception product therefore provides this system with the necessary directionality, according to the known principle of crossed antennas (mil-cross array).

According to a preferred embodiment, use is made of one of the two vertical antennas for emitting the frequencies A and B and of the other for emitting the frequency C, which makes it possible to simplify the design of these antennas. It is, however, possible to make use of just one vertical antenna located at the middle of the space described for the two antennas of FIG. 1 and therefore allowing the three frequencies A, B and C to be emitted.

Classifying moored mines presents a particular problem because these mines are submersed with water above and below, held in this position by the mooring line which connects them to a dead weight slewing on the seabed.

This being the case, actual classification, which consists in discerning the mines from other objects, such as rocks, using a high-frequency sonar that gives a very precise image of the image to be classified, is unnecessary because such an object held motionless with water above and below must correspond to a moored mine.

It does, however, become necessary to determine this submersion precisely, something which is not possible to achieve with the simple crossed-antennas system.

Figure 5:
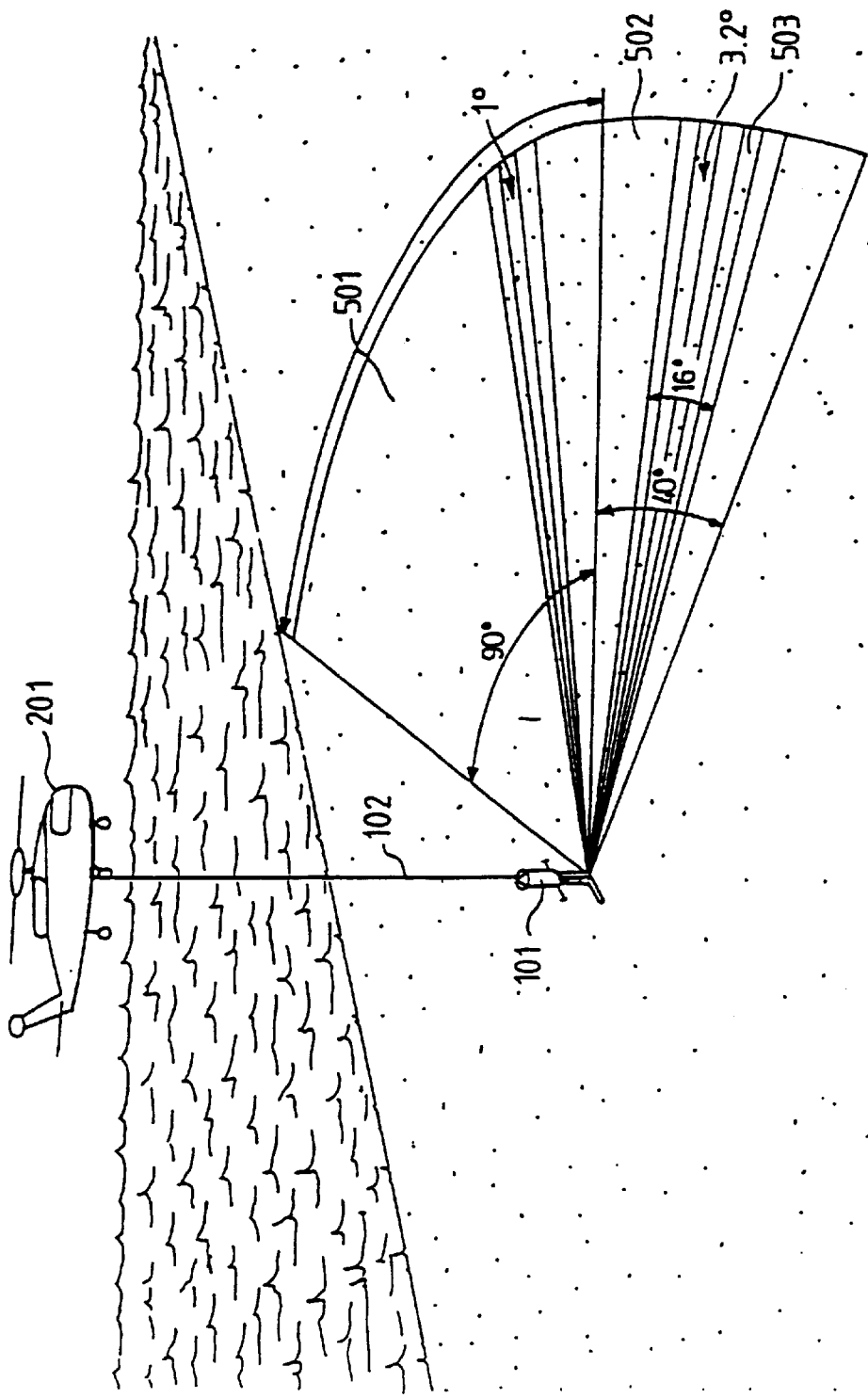

This being the case, and according to a known technique, use is made of an emission at frequency B making it possible to obtain, on reception on the seabed, as depicted in FIG. 5, an exploration sector 501 with an aperture of 90° and made up of 90 contiguous beams with a 1° aperture.

In order then to determine the height of the moored mines above the seabed, use is made, on emission, of a set of relatively narrow contiguous beams 502 that can be identified on reception. For that, each of these beams has a distinct frequency lying within the range B. This lobe will, for example, have an aperture of 16° and be made up of 5 beams with a 3.2° aperture. The echoes will be separated on reception by filtering, according to the so-called coloured emission principle. First of all, the finite value of the elevation is obtained by interpolation, and then the height is obtained from the distance which is known from the propagation time.

As the aperture of the lobe is nonetheless relatively small, use will be made of the means that allow this lobe to be stabilized in terms of elevation, which means were described earlier, to also obtain an electronic scanning in elevation over a sector 504, the aperture of which will, for example, be 40°.

What is claimed is:

1. A dipping airborne sonar for detecting and classifying underwater mines, comprising:
    a cylindrical body having an elongated axis;
    means for rotating the cylindrical body about its longitudinal axis thereby to orient the cylindrical body;
    at least one elongated sonar emitting antenna, formed along the axis of the cylindrical body, for emitting signals forming an emitting lobe which is broader in a horizontal plane than in a vertical plane with reference to said cylindrical body; and
    a sonar receiving antenna for receiving a set of juxtaposed channels covering an angular detection sector.

2. A dipping airborne sonar according to claim 1 for locating moored mines submerged in water above a seabed, further comprising means for powering the emitting antenna in order to obtain a transmission lobe formed of a set of contiguous beams that can be identified on reception so that, in combination with the reception characteristics of the sonar receiving antenna, a location of the moored mines above the seabed can be determined.

3. A dipping airborne sonar according to claim 1, wherein said stabilizing means are located at the distal ends of additional arms which are deployable into a position perpendicular to the axis of the cylindrical body and articulated by means for allowing said additional arms to be folded back into channels formed in a face of the cylindrical body parallel to the axis of the cylindrical body.

4. A dipping airborne sonar according to claim 2, wherein said stabilizing means are located at the distal ends of additional arms which are deployable into a position perpendicular to the axis of the cylindrical body and articulated by means for allowing said additional arms to be folded back into a set of channels formed in a face of the cylindrical body parallel to the axis of the cylindrical body.

5. The dipping airborne sonar according to claim 1, wherein said at least one elongated sonar emitting antenna is formed on the cylindrical body such that the emitting lobe and a receiving lobe of the sonar receiving antenna combine in accordance with the crossed antennas principle.

6. A dipping airborne sonar according to claim 1, wherein said sonar receiving antenna comprises deployable arms including receiving sensors situated therein, each deployable arm is attached to an end of the cylindrical body by hinges such that each deployable arm can be deployed into a position perpendicular to the axis of the cylindrical body, and said dipping airborne sonar further comprises means for receiving said deployable arms within said cylindrical body parallel to the axis of said cylindrical body.

7. A dipping airborne sonar for detecting and classifying underwater mines, comprising:
    a cylindrical body having an elongated axis;
    propulsion motors configured to rotate the cylindrical body about its longitudinal axis thereby to orient the cylindrical body;
    at least one elongated sonar emitting antenna formed along the axis of the cylindrical body, and configured to emit signals forming an emitting lobe which is broader in a horizontal plane than in a vertical plane with reference to said cylindrical body; and
    a sonar receiving antenna configured to receive a set of juxtaposed channels covering and angular detection sector.

8. A dipping airborne sonar according to claim 7, wherein said propulsion motors are located at the distal ends of additional arms which are deployable into a position perpendicular to the axis of the cylindrical body and are articulated by hinges allowing said additional arms to be folded back into a second set of channels formed in a face of the cylindrical body parallel to the axis of the cylindrical body.

9. A dipping airborne sonar according to claim 7 for locating moored mines submerged in water above a seabed, further comprising an electrical power unit configured to power the emitting antenna in order to obtain a transmission lobe formed of a set of contiguous beams that can be identified on reception so that, in combination with the reception characteristics of the sonar receiving antenna, a location of the moored mines above the seabed can be determined.

10. A dipping airborne sonar according to claim 7, wherein said sonar receiving antenna comprises deployable arms including receiving sensors situated therein, each deployable arm is attached to an end of the cylindrical body by hinges such that each deployable arm can be deployed into a position perpendicular to the axis of the cylindrical body, and said dipping airborne sonar further comprises channels each configured to receive said deployable arms within said cylindrical body parallel to the axis of said cylindrical body.

* * * * *